United States Patent
Abali et al.

(10) Patent No.: US 6,944,740 B2
(45) Date of Patent: Sep. 13, 2005

(54) METHOD FOR PERFORMING COMPRESSED I/O WITH MEMORY EXPANSION TECHNOLOGY

(75) Inventors: Bulent Abali, Tenafly, NJ (US); Mohammad Banikazemi, Mount Kisco, NY (US); Dan E. Poff, Mahopac, NY (US); Charles O. Schulz, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 10/108,017

(22) Filed: Mar. 27, 2002

(65) Prior Publication Data

US 2003/0188110 A1 Oct. 2, 2003

(51) Int. Cl.[7] ............................................. G06F 12/00
(52) U.S. Cl. ....................... 711/170; 711/154; 711/104; 710/68
(58) Field of Search ........................ 711/170–172, 206, 711/173, 154, 159, 207, 209, 220, 221; 707/101; 710/68

(56) References Cited

U.S. PATENT DOCUMENTS

| | | | | |
|---|---|---|---|---|
| 5,761,536 A | * | 6/1998 | Franaszek | 710/68 |
| 6,094,707 A | * | 7/2000 | Sokolov et al. | 711/113 |
| 6,279,092 B1 | * | 8/2001 | Franaszek et al. | 711/170 |
| 6,446,145 B1 | * | 9/2002 | Har et al. | 710/68 |
| 6,539,460 B2 | * | 3/2003 | Castelli et al. | 711/154 |
| 6,665,787 B2 | | 12/2003 | Franaszek et al. | 711/206 |
| 6,779,088 B1 | * | 8/2004 | Benveniste et al. | 711/145 |
| 2002/0083294 A1 | * | 6/2002 | Allison et al. | 711/207 |

OTHER PUBLICATIONS

Tremaine, et al., IBM Memory Expansion Technology (MXT), IBM J. Res. & Dev. vol. 48, No. 2, Mar. 2001, pp. 271–285.

* cited by examiner

*Primary Examiner*—Matthew D. Anderson
*Assistant Examiner*—Shane Thomas
(74) *Attorney, Agent, or Firm*—F. Chau & Associates, LLC

(57) ABSTRACT

A method is provided for manipulating a compressed translation table in a memory expansion technology system. The method comprises swapping contents of an output buffer with contents of a compression buffer, disabling compression for compression translation table entries corresponding to the content swapped to the compression buffer, and packaging entries of a compression translation table corresponding to the contents swapped to the compression buffer, wherein packaged compression translation table entries are accessible to a computer system for addressing the contents swapped to the compression buffer.

16 Claims, 5 Drawing Sheets

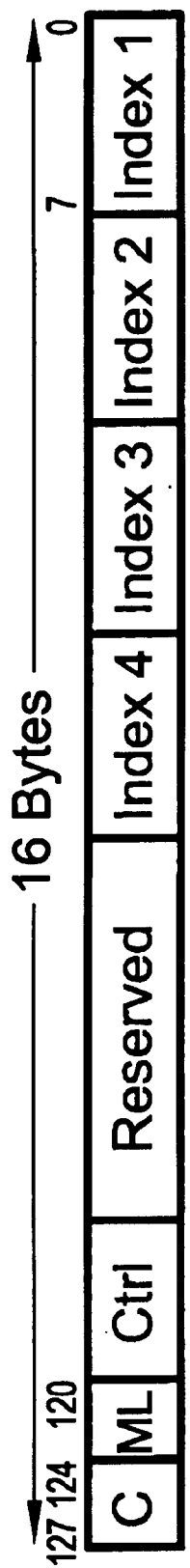
FIG. 5a Non-trivial Lines
FIG. 5b Trivial Lines

METHOD FOR PERFORMING COMPRESSED I/O WITH MEMORY EXPANSION TECHNOLOGY

BACKGROUND OF THE INVENTION

1. Field of the Invention

The present invention relates to data compression, and more particularly to a method for accessing data in compressed format for input/output operations.

2. Discussion of the Related Art

Memory Expansion Technology or MXT, a trademark of International Business Machines Corporation, is a memory subsystem for compressing main memory content. MXT effectively doubles the physical memory available to a processor, input/output (I/O) devices and application software. MXT is transparent to CPUs, I/O devices, device drivers, and application software. Although the memory content is in compressed form whenever possible, when the memory is accessed, the content, e.g., data, is first uncompressed and then served to various components of the system such as the processor and I/O devices. Therefore, the system does not have access to data in the compressed form.

An organization of the MXT system is shown in FIG. 1. The main memory 101 in an MXT system comprises compressed data. A third level (L3) cache with 1 KB line size made of double data rate (DDR) SDRAM 102 can be used for accessing main memory 101. An L3 cache 102 comprises uncompressed cache lines. The L3 cache 102 hides the latency of accessing the compressed main memory 101 as a large percentage of accesses results in L3 cache hits. The compressed memory/L3 cache controller 102 performs the real to physical address translation and the compression/decompression functions. A central processing unit (CPU), e.g., 103, and I/O devices connected to an I/O bridge, e.g., 104, can be connected to the main memory 101 through the L3 cache 102. Therefore, for I/O operations, data can be transferred to and from I/O devices through the L3 cache 102. As a consequence, I/O operations can access data in uncompressed form.

An example of a compression algorithm for MXT is a parallelized variation of the Lempel-Ziv algorithm known as LZ1. The compression scheme stores compressed data blocks to the memory in a variable length format. The unit of storage in compressed memory is a 256 byte sector. Depending on its compressibility, a 1 KB block of memory, corresponding to the size of an L3 line, can occupy zero to four sectors in the compressed memory. Due to this variable length format, the controller needs to translate real addresses on the system bus to physical addresses in the physical memory. Real addresses are conventional addresses seen on the processor's external bus. Physical addresses are used for addressing 256 byte sectors in the compressed memory. The real memory is merely an address space whose small sections reside in the L1/L2/L3 caches for immediate access. Memory content not in the cache reside in the physical memory in compressed form. The memory controller performs real-to-physical address translation by a lookup in a Compression Translation Table (CTT), which can be kept at a reserved location in the physical memory.

Referring to FIG. 2, each real address of a 1 KB block, e.g., 201, maps to one entry in the CTT, e.g., 202. Each CTT entry is 16 bytes long. A CTT entry includes four physical sector addresses, e.g., 203, each capable of pointing to a 256-byte sector in the physical memory, e.g., 204. For example, a 1 KB L3 line, which compresses by a factor of two, will occupy two sectors in the physical memory (512 bytes) and the CTT entry will comprise two addresses, each pointing to a sector (FIG. 2). The remaining two pointers will be invalid.

For blocks that compress to less than 120 bits, for example a block full of zeros, a CTT format called trivial line format exists. In this format, the compressed data can be stored entirely in the CTT entry replacing the four address pointers (FIG. 2). Therefore, a trivial block of 1 KB occupies only 16 bytes in the physical memory resulting in a compression ratio of 64 to 1.

MXT systems are configured to have real address space twice the physical memory size, since measurements show that compression ratio of two is typical for many applications. For example, an MXT system with 1 GB of installed SDRAM will appear as having 2 GB of memory.

However, no system or method is known to exist for managing the CTT such that data is accessible to the CPU and I/O operations in a compressed format. Therefore, a need exists for a method of manipulating data table entries, wherein the compressed data can be directly accessed by I/O operations.

SUMMARY OF THE INVENTION

According to an embodiment of the present invention, a method is provided for manipulating a compressed translation table in a memory expansion technology system. The method comprises swapping contents of an output buffer with contents of a compression buffer, disabling compression for compression translation table entries corresponding to the content swapped to the compression buffer, and packaging entries of a compression translation table corresponding to the contents swapped to the compression buffer, wherein packaged compression translation table entries are accessible to a computer system for addressing the contents swapped to the compression buffer.

Swapping further comprises the step of performing a page swap.

Packaging entries of the compression translation table further comprises making a copy of the compression translation table entries, and storing the copy in a buffer. Packaging entries of the compression translation table further comprises modifying the compression translation table entries, and generating metadata, wherein the metadata describes the contents of a modified CTT entry. Packaging entries of the compression translation table further comprises the step of flushing the compression translation table entries from a cache.

At least one compression buffer exists in real memory.

The method further comprises unpacking, wherein unpacking comprises uncompressing the contents of the compression buffer, and transferring contents of the compression buffer to a destination buffer. Uncompressing the contents of the compression buffer comprises generating an unpacked compression translation table entries according to metadata describing the compression translation table corresponding to the contents of the compression buffer, disabling compression for the unpacked compression translation table entries, and flushing compression translation table entries corresponding to the contents of the compression buffer from a cache. The method further comprises preparing the compression buffer to receive the contents of the compression buffer.

Preparing the compression buffer comprises zeroing out the compression buffer with a page operation.

The method comprises transferring the content of the compression buffer to a destination buffer. Transferring the content of the compression buffer comprises one of a page swap and a memory copy.

According to an embodiment of the present invention, a program storage device is provided, readable by machine, tangibly embodying a program of instructions executable by the machine to perform method steps for manipulating a compressed translation table in a memory expansion technology system. The method comprises swapping contents of an output buffer with contents of a compression buffer, disabling compression for compression translation table entries corresponding to the content swapped to the compression buffer, and packaging entries of a compression translation table corresponding to the contents swapped to the compression buffer, wherein packaged compression translation table entries are accessible to a computer system for addressing the contents swapped to the compression buffer.

According to an embodiment of the present invention, a memory expansion technology comprises a compression buffer reserved for the data corresponding to a compression translation table to be packed, and metadata describing the content of the compressed compression translation table after packing.

A plurality of compression buffers are provided.

The compressed entries of the compression translation table comprise a plurality of sector pointers comprising the addresses of data in the output buffer.

BRIEF DESCRIPTION OF THE FIGURES

Preferred embodiments of the present invention will be described below in more detail, with reference to the accompanying drawings:

FIG. 5a is a diagram of metadata corresponding to a non-trivial compression translation table entry according to an embodiment of the present invention; and FIG. 5b is a diagram of metadata corresponding to a trivial compression translation table entry according to an embodiment of the present invention.

DETAILED DESCRIPTION OF PREFERRED EMBODIMENTS

According to an embodiment of the present invention, compression translation table (CTT) entries can be manipulated such that data content of a memory can be accessed using compressed CTT entries. For example, for a given buffer in main memory, CTT data can be transferred to a Compressed I/O (CIO) buffer. The transfer of CTT data can be done by using the swap page operation and/or copy operations. CTT entries associated with the CIO buffer can be manipulated such that the sectors that represent sector pointer data are packed. Each CTT entry comprises four sector pointers. The sector pointer data can be accessed in compressed form or swapped to a buffer for later use. One of ordinary skill in the art would appreciate in light of the present disclosure that other CTT entry formats are possible.

Figure 1:
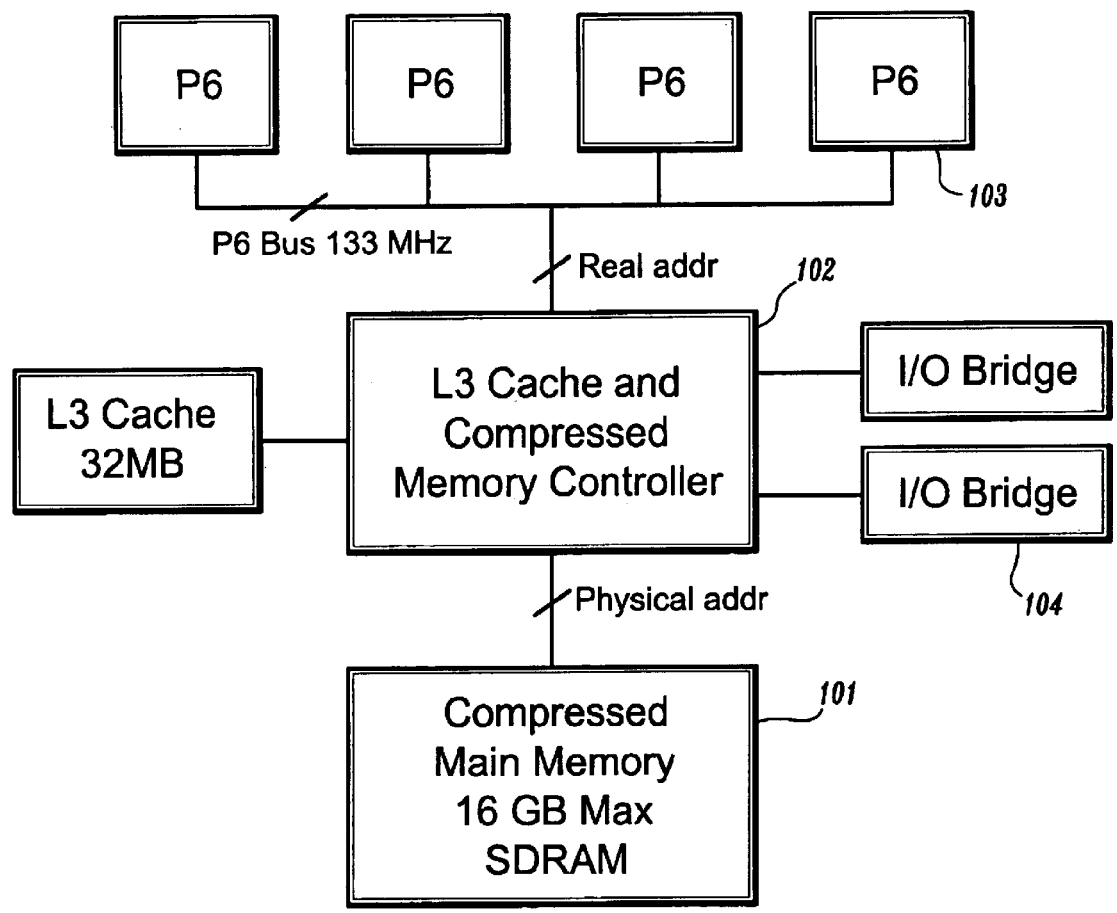
FIG. 1 is a diagram of MXT hardware organization.
Figure 2:
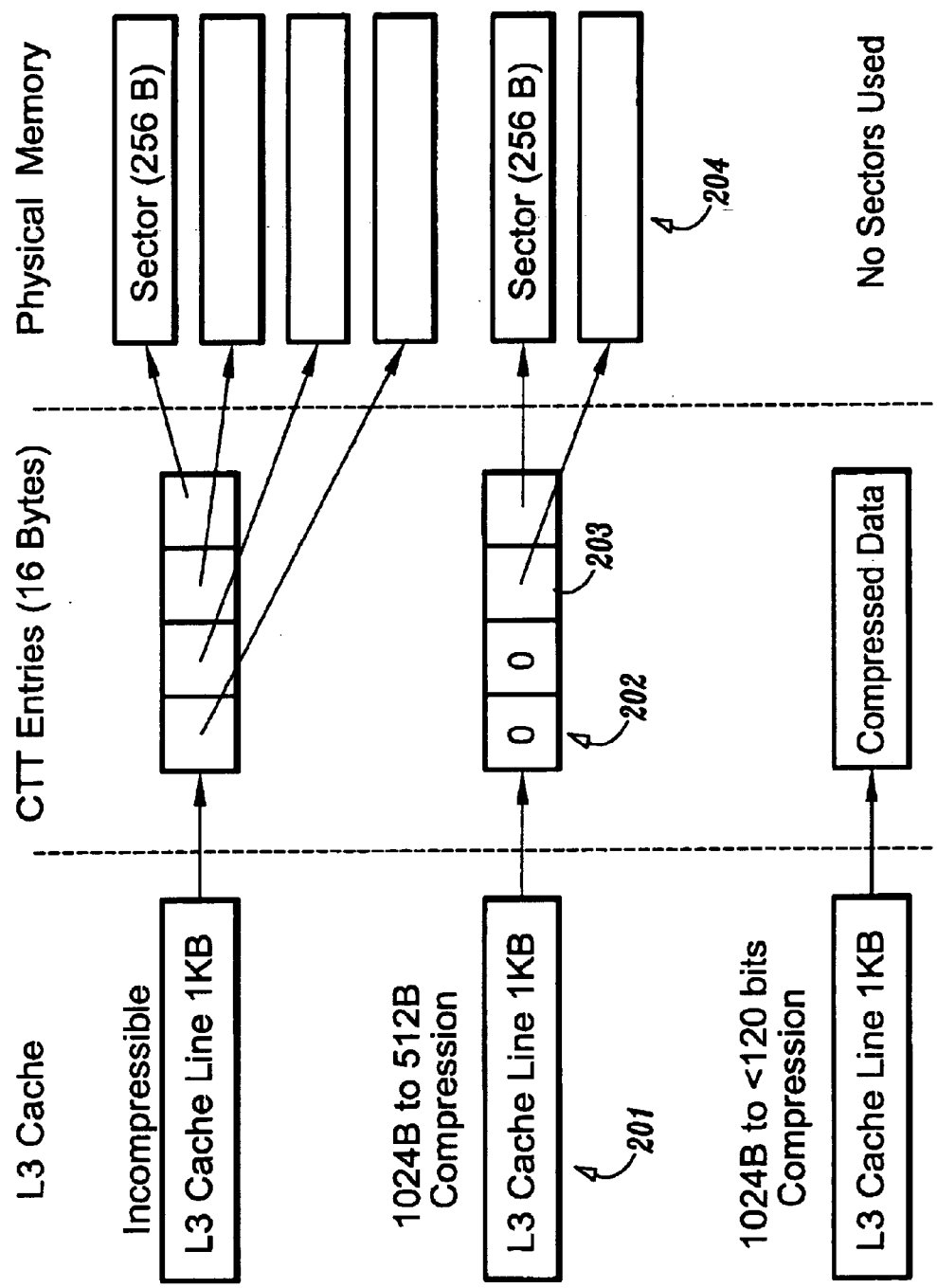
FIG. 2 is a diagram showing address translation through a compression translation table.
Figure 3:
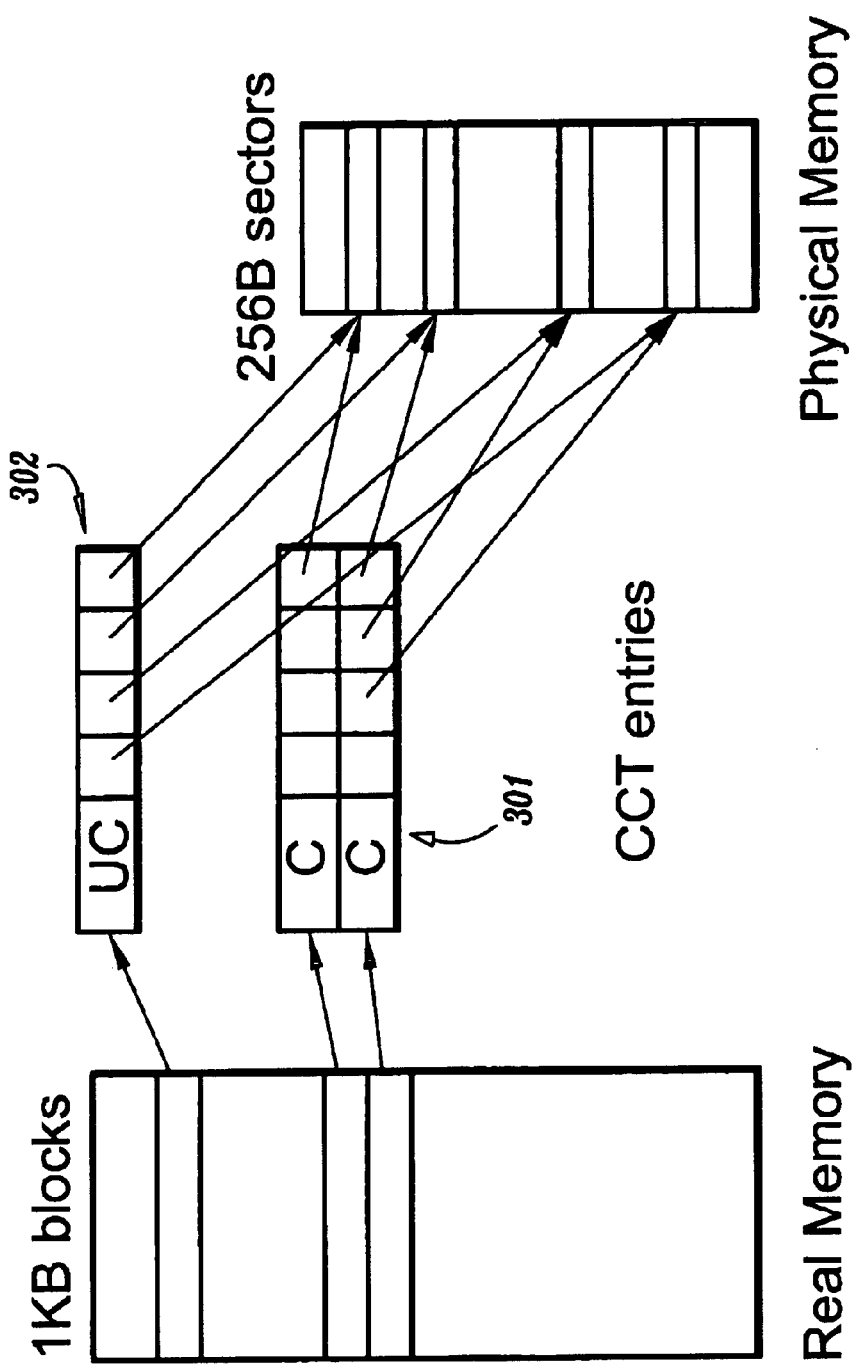
FIG. 3 is a diagram showing compressed data being accessed through the manipulation of compression translation table entries according to an embodiment of the present invention.

The information for undoing this operation, metadata, can be stored in the main memory preceding the data itself. FIG. 3 illustrates an example of how a 2 KB buffer 301 in unpacked form can be accessed as a 1 KB buffer 302 in packed form.

According to an embodiment of the present invention, CTT sector pointer data can be prepared to be accessed in compressed form (packing) and accessed in uncompressed form when it is received or stored in compressed form (unpacking). A buffer can be used for implementing the proposed scheme.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

To implement a method according to the present invention, the CTT entries can be modified by software. Since CTT entries can also be modified by the hardware, a means is provided to avoid any inconsistencies in the entries caused by hardware manipulation of the CTT entries. In particular, when a CTT entry is being modified by software, no other CTT entry that belongs to the same cache line can be modified by hardware. An aligned Compressed I/O (CIO) buffer can be implemented to avoid inconsistencies in the entries. For example, a 64 KB Compressed I/O (CIO) buffer, which is 64 KB aligned, can be implemented to avoid inconsistencies in the entries. The CTT entries associated with the CIO buffer need, for example, 1 KB (64*16 Bytes) of memory. The entries fit in a 1 KB cache line, and thus, any inconsistency in the content of CTT entries can be avoided.

Another embodiment of the present invention uses a page operation that is aware of which CTT entries can be modified. Using such a page operation can eliminate the need for CIO buffers.

Page operations, in a MXT system that uses dynamically allocated physical memory and a compression translation table for managing this memory, provides a method under the control of hardware for performing the page operations by manipulating the compression translation table. When page operations are used, the data of pages involved in the operation is not accessed by the processor, and therefore is not needed in the memory cache hierarchy, thus eliminating the cache damage typically associated with these block operations. Further, the manipulation of the translation table involves reading and writing a few bytes to perform the operation, as opposed to reading and writing hundreds or thousands of bytes in the pages being manipulated. This results in a significant savings in time to perform the actual operation and further represents a smaller performance impact on other activities of the processor.

It should be noted that the number of CIO buffers can be more than one. For example, different buffers can be used for output and input operations.

Figure 4:
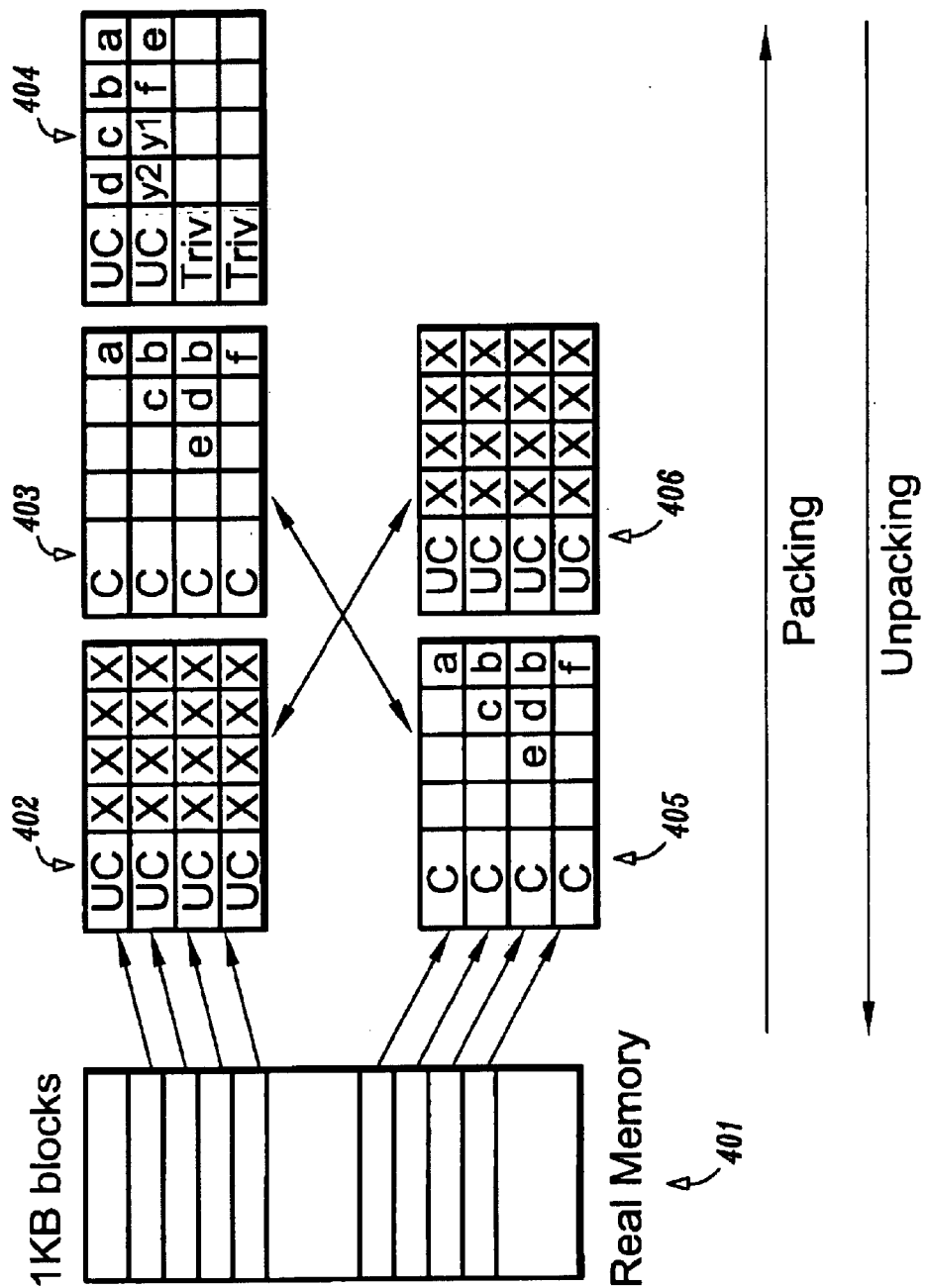
FIG. 4 shows a packing and an unpacking process according to an embodiment of the present invention.

As shown in FIG. 4, real memory content of a buffer 405 can be swapped to an initialized CIO buffer 402. Thus, the CIO buffer 403 comprises the real memory content of buffer 405. A copy of the CTT entries, e.g., 403, of CIO can be saved such that if an immediate undoing of the packing operation is needed it can be done quickly. The CTT entries can be modified such that all the sector pointers are packed in CTT entries 404.

Real memory, in the context of MXT technology can be, for example, the address space of a compressed main memory.

Metadata can be constructed while the packing process is being performed. If after packing sector pointers, there exists a CTT entry which has one, two, or three pointers, e.g., the second line in 403, the remaining sector pointers in that entry can be set to pointers used for such a case, y1 and y2 pointers. Up to four sectors can be used for such a case by putting incompressible data in the first 1K of CIO and modifying the corresponding entry such that it becomes a trivial line. CTT entries that have become free because of the packing process are set to represent trivial lines. After data is used for an output operation, original CTT entries for the CIO buffer can be restored and the data can be swapped back to it's original location. Alternatively, the compressed data can be transferred to another buffer, which can be accessed later. It should be noted that accesses to data in compressed form should not modify it.

Packing comprises moving the contents of an output buffer to CIO buffer; by using the swap page operations and memory copy operations. Corresponding CTT entries can be manipulated such that data can be accessed in compressed form. A compression disable region can be placed over CTT such that the MXT hardware does not attempt to compress the content of CTT. A copy of the original CTT entries can be saved for the CIO Buffer. The CTT entries can be manipulated and metadata can be generated. The original CIO buffer CTT entries can be flushed. If output is needed, the method of packing puts a compression disable region over the CIO buffer comprising the compressed data; and uses the compressed form of data for output operations. Data can be moved to another buffer; for moving data to another buffer, for example, the original buffer including the data, in uncompressed form, original CTT entries can be copied to CIO buffer CTT entries. The CIO buffer CTT entries can be flushed. The data can be moved by using swap and copy operations. For moving data in the compressed form to another buffer, for example, the original buffer including the data, the method can use swap and copy operations.

Referring to FIG. 4, for unpacking, the data can be restored to its original form from the compressed form by using the metadata transferred or stored with the data. The compressed form of data 404 is unpacked to recreate the original CIO buffer 403 and can be transferred or swapped to a destination buffer 405. The move can be done by using the swap page operations and/or memory copies. Unpacking comprises preparing the CIO buffer for receiving data in compressed form; zeroing out CIO buffer with page operations; and putting the compression disable region over CIO buffer. The input data can be moved to CIO buffer by using the swap fast page operation and/or memory copy operations if data is not already in the CIO buffer. The uncompressed form of data can be produced by processing metadata to produce the CTT entries. The CIO buffer CTT entries can be flushed. Data can be moved to a destination buffer; by using the swap page operations and/or memory copy the data can be moved to the destination.

There are various methods of representing the metadata. The size of entries for each 1 KB line can be variable or constant. While using variable length entries can minimize the size of the metadata, constant length entries can simplify the unpacking process. An embodiment of a metadata format having constant sized entries is shown in FIGS. 5a and 5b. The metadata for each 1K block of data is a 16-byte entity before the packing process. Trivial lines and nontrivial lines can be distinguished by the value of the most significant bit of the "C" field. For example, a zero indicates a nontrivial line and a one indicates a trivial line. The last entity in the metadata can be marked with a one in the second most significant bit of the "C" field. The number of sectors used for metadata is indicated in the "ML" field. Only the first entry in the metadata is needed to have the number of metadata sectors. The sector pointers in each entity for nontrivial lines is the index to the 256-byte sectors in the compressed form (8 bits). Other items can be included in the "Ctrl" field. For example, Fragment size (3 bits), End flag (1 bit), CMP flag (1 bit), and Class (2 bits). The content of the entries for trivial line is the same as the original content of the CTT entry, except that the most significant byte as explained earlier. The metadata can be padded such that it can be represented with an integral number of 256-byte sectors.

The first page of the CIO buffer can be used for storing the metadata, and creating the sectors used for filling the last CTT entry of compressed data. According to a preferred embodiment, each 1 KB of data needs 16 bytes of metadata. Thus, the maximum size of metadata for a 64 KB data is therefore 1 KB. The metadata can be constructed in the last sectors of the last line of the first page in the CIO buffer. It should be noted that other metadata formats would be obvious to one of ordinary skill in the art in light of the present invention.

According to an embodiment of the present invention, for network I/O the send and receive, buffers should have the same alignment. If the alignment of these buffers are different, data can be copied into a new buffer with page alignment before the packing process is performed. Similarly, the data is unpacked at the receiving node and then copied to the receive buffer.

For moving data between any given buffer and the CIO buffer swap fast page operations and memory copies can be used. Since page operations work on memory pages, memory copy operations may be needed for copying the starting and ending portions of the buffer which are not page aligned. Swap page operations cannot be used for changing the alignment of data, however, memory copy can be used for this purpose.

Having described preferred embodiments of a system and method of compressing data, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for manipulating a compressed translation table in a memory expansion technology system comprising:
    swapping contents of an output buffer to a compression buffer;
    disabling compression for compression translation table entries corresponding to the content swapped to the compression buffer; and
    packaging entries of a compression translation table corresponding to the contents swapped to the compression buffer, wherein packaged compression translation table entries are accessible to a computer system for addressing the contents swapped to the compression buffer, and wherein packaging entries of the compression translation table further comprises making a copy of the compression translation table entries, and storing the copy in a buffer.

2. The method of claim 1, wherein swapping further comprises performing a page swap.

3. The method of claim 1, wherein packaging entries of the compression translation table further comprises:
    modifying the compression translation table entries; and
    generating metadata, wherein the metadata describes contents of a modified compression translation table entry.

4. The method of claim 1, wherein packaging entries of the compression translation table further comprises flushing the compression translation table entries from a cache.

5. The method of claim 1, wherein at least one compression buffer exists in real memory.

6. The method of claim 1, further comprising unpacking entries of the compression translation table, wherein unpacking further comprises:
    uncompressing the contents of the compression buffer; and
    transferring contents of the compression buffer to a destination buffer.

7. The method of claim 6, wherein uncompressing the contents of the compression buffer comprises:
    generating an unpacked compression translation table entries according to metadata describing the compression translation table corresponding to the contents of the compression buffer;
    disabling compression for the unpacked compression translation table entries; and
    flushing compression translation table entries corresponding to the contents of the compression buffer from a cache.

8. The method of claim 6, further comprising preparing the compression buffer to receive the contents of the compression buffer.

9. The method of claim 8, wherein preparing the compression buffer comprises the step of zeroing out the compression buffer with a page operation.

10. The method of claim 6, wherein transferring the content of the compression buffer comprises one of a page swap and a memory copy.

11. The method of claim 1, wherein disabling compression prevents compression of at least one entry of the compression translation table by hardware and allows packaging of the at least one entry of the compression translation table by software.

12. The method of claim 1, further comprising a memory copy performed prior to the packing for data of the compression buffer, wherein data of the compression buffer is unaligned and the memory copy comprises copying the unaligned data of the compression buffer into a page aligned compression buffer.

13. A program storage device readable by machine, tangibly embodying a program of instructions executable by the machine to perform method steps for manipulating a compressed translation table in a memory expansion technology system, the method steps comprising:
    swapping contents of an output buffer to a compression buffer;
    disabling compression for compression translation table entries corresponding to the content swapped to the compression buffer; and
    packaging entries of a compression translation table corresponding to the contents swapped to the compression buffer, wherein packaged compression translation table entries are accessible to a computer system for addressing the contents swapped to the compression buffer, and wherein packaging entries of the compression translation table further comprises making a copy of the compression translation table entries, and storing the copy in a buffer.

14. The method of claim 13, wherein disabling compression prevents compression of at least one entry of the compression translation table by hardware and allows packaging of the at least one entry of the compression translation table by software.

15. A memory expansion technology system comprising:
    a compression buffer reserved for data corresponding to a compression translation table to be packed, wherein a plurality of compression buffers are provided wherein an alignment of data of each of the compression buffers is the same; and
    metadata describing the content of the compressed compression translation table after packing.

16. The system of claim 15, wherein compressed entries of the compression translation table comprise a plurality of sector pointers comprising addresses of data in the output buffer.

* * * * *